US008620306B2

(12) United States Patent
Pon et al.

(10) Patent No.: US 8,620,306 B2
(45) Date of Patent: Dec. 31, 2013

(54) LOCATION SPECIFIC SEARCH FOR REGIONAL SATELLITE VEHICLES

(75) Inventors: Rayman Wai Pon, Cupertino, CA (US); Marc Ische, San Diego, CA (US); Borislav Ristic, San Diego, CA (US); Jie Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1284 days.

(21) Appl. No.: 12/145,361

(22) Filed: Jun. 24, 2008

(65) Prior Publication Data

US 2009/0318167 A1    Dec. 24, 2009

(51) Int. Cl.
| H04W 4/00 | (2009.01) |
| H04W 24/00 | (2009.01) |
| G01S 19/00 | (2010.01) |
| G01S 19/42 | (2010.01) |

(52) U.S. Cl.
USPC ............... 455/427; 455/456.1; 455/456.6; 342/357.2; 342/357.25

(58) Field of Classification Search
USPC ............. 455/426.1, 427, 456.1, 456.6, 552.1, 455/553.1; 342/357.2, 357.21, 357.25
See application file for complete search history.

(56) References Cited

U.S. PATENT DOCUMENTS

| 5,398,034 | A | * | 3/1995 | Spilker, Jr. ............... 342/357.27 |
| 6,018,315 | A | * | 1/2000 | Ince et al. ................. 342/357.27 |
| 6,040,798 | A | | 3/2000 | Kinal et al. |
| 6,208,290 | B1 | | 3/2001 | Krasner |
| 6,801,854 | B1 | | 10/2004 | Pemble et al. |
| 7,031,730 | B1 | | 4/2006 | Barber et al. |
| 7,233,798 | B2 | * | 6/2007 | Drawert et al. ............. 455/456.1 |
| 7,729,450 | B2 | * | 6/2010 | Thor et al. ..................... 375/316 |
| 2003/0114170 | A1 | * | 6/2003 | Rick et al. ..................... 455/456 |
| 2004/0180670 | A1 | * | 9/2004 | Pande et al. ................. 455/456.1 |
| 2006/0082497 | A1 | * | 4/2006 | Rotman et al. ........... 342/357.09 |
| 2006/0217130 | A1 | * | 9/2006 | Rowitch et al. ............ 455/456.1 |
| 2007/0040700 | A1 | * | 2/2007 | Bachelder ..................... 340/902 |

FOREIGN PATENT DOCUMENTS

| JP | 11083976 A | 3/1999 |
| JP | 11271419 A | 10/1999 |
| JP | 2001228232 A | 8/2001 |
| JP | 2005283187 | 10/2005 |

(Continued)

OTHER PUBLICATIONS

"ESTB/EGNOS FAQ", European Geostationary Navigation Overlay Service, Update May 2006, pp. 1-10.

(Continued)

*Primary Examiner* — Wesley Kim
(74) *Attorney, Agent, or Firm* — Linda G. Gunderson (57) ABSTRACT

A position location system, method, and apparatus are disclosed. A wireless device receives a first signal and obtains an identifier indicative of a first location from the first signal. The first signal can be received from a cellular base station and the first identifier can be a mobile country code. The wireless device uses the identifier to determine the availability of signals from a regional satellite system at the first location. If signals from the regional satellite system are available at the first location, the wireless device retrieves information associated with one or more satellite vehicles in the regional satellite system. The information can include pseudo-random number codes and a Doppler search range corresponding to the first location. The wireless device receives a second signal and processes the second signal to obtain first satellite signal information. The wireless device determines its position at least partially based on the first satellite signal information.

41 Claims, 5 Drawing Sheets

(56) References Cited

FOREIGN PATENT DOCUMENTS

| | | |
|---|---|---|
| JP | 2006317225 A | 11/2006 |
| JP | 2007505292 A | 3/2007 |
| JP | 2007518064 A | 7/2007 |
| RU | 2182341 C2 | 5/2002 |
| WO | 9622546 A1 | 7/1996 |
| WO | 9718485 A1 | 5/1997 |
| WO | 2005022187 A2 | 3/2005 |

OTHER PUBLICATIONS

Kogure, "QZSS/MSAS Status," CGSIC—47th Meeting, Fort Worth, Texas, Sep. 25, 2007, pp. 1-23.

Kovar et al., "Augmentation Methods for GNSS Integrity and Precision Enhancement in Difficult Environment," In Proceedings of TimeNav 07, ENC-GNSS—European Navigation Conference [CD-ROM]. Stoughton: The Printing House Inc., 2007, p. 107-114. ISBN 1-4244-0647-1.

Sakai et al., "Implementation of Prototype Satellite-Bases Augmentation System (SBAS)," Paper No. 60, International Global Navigation Satellite Systems Society, IGNSS Symposium 2006, Holiday Inn Surfers Paradise, Australia, Jul. 17-21, 2006, pp. 1-10.

Toran et al., "Satellite Navigation, Wireless Networks and the Internet," ESA Bulletin 121, European Space Agency, European Union and Industrial Programmes, Feb. 2005, pp. 28-35.

Ventura-Traveset, GNSS-1 Project Office, European Geostationary Navigation Overlay Service (EGNOS) Project Office, Toulouse, France, European Space Agency, Jan. 22, 2003, pp. 1-41.

International Search Report & Written Opinion—PCT/US2009/048273, International Search Authority—European Patent Office—Sep. 29, 2009.

Taiwan Search Report—TW098121226—TIPO—Oct. 1, 2012.

* cited by examiner

| Country_Code 310 | RNSS_ID 320 | SV_Name 330 | SV_ID 340 | Orbital 350 | Doppler Search Range 360 |
|---|---|---|---|---|---|
| 208 | EGNOS | AOR-E | 120 | GEOSTAT | 0 |
| 208 | EGNOS | ARTEMIS | 124 | GEOSTAT | 0 |
| 208 | EGNOS | IND-W | 126 | GEOSTAT | 0 |
| ... | ... | ... | ... | ... | ... |
| 441 | QZSS | QZS1 | 183 | GEOSYNC | ±225 m/s |
| ... | ... | ... | ... | ... | ... |
| 505 | QZSS | QZS1 | 183 | GEOSYNC | ±550 m/s |
| ... | ... | ... | ... | ... | ... |

| Time_Zone 380 | RNSS_ID 320 | SV_Name 330 | SV_ID 340 | Visibility_Ndx 370 | Orbital 350 | Doppler Search Range 360 |
|---|---|---|---|---|---|---|
| UTC+01 | EGNOS | AOR-E | 120 | 60% | GEOSTAT | 0 |
| ... | ... | ... | ... | ... | ... | ... |

FIG. 4

LOCATION SPECIFIC SEARCH FOR REGIONAL SATELLITE VEHICLES

BACKGROUND

This disclosure relates generally to position location and, more particularly, to positioning with signals from regional satellite systems.

Global navigation satellite systems (GNSS) provide positioning data to users throughout the world. Using information from different GNSS satellites, it is possible to determine location within a global coverage area and to synchronize with satellite time.

More recently, regional satellite systems have been developed to augment existing GNSS systems. Regional satellite systems serve specific parts of the world and, among other things, aim to improve the accuracy, integrity, and availability of global satellite positioning within their respective service areas.

Mobile devices are increasingly available which can receive and process signals from both global and regional satellite systems. By their very nature, these devices change position and can therefore move into and out of the coverage areas of different regional satellite systems.

As a result, a mobile device may search for a regional satellite vehicle that is not accessible from its current location. This fruitless search wastes time, power, and search capacity and thus degrades positioning performance. Alternatively, the mobile device may be programmed to wait until after a position fix is obtained before determining the availability of regional satellites. This also lengthens the time needed to arrive at a fully accurate position and results in reduced performance.

BRIEF SUMMARY OF EMBODIMENTS

A position location system, method, and apparatus are disclosed. A wireless device receives a first signal and obtains an identifier indicative of a first location from the first signal. The first signal can be received from a cellular base station and the first identifier can be a mobile country code. The wireless device uses the identifier to determine the availability of signals from a regional satellite system at the first location. If signals from the regional satellite system are available at the first location, the wireless device retrieves information associated with one or more satellite vehicles in the regional satellite system. The information can be maintained at the wireless device and can include pseudo-random number codes or other satellite identifiers as well as a Doppler search range corresponding to the first location. The wireless device processes satellite signals from the one or more satellite vehicles and determines its position based at least partly on information obtained from the satellite signals. The wireless device can process signals from the regional satellite system while also processing for signals from one or more global positioning satellite systems.

In one embodiment, a position location method is disclosed. The method includes receiving a first signal and obtaining an identifier from the first signal indicative of a first location. The method also includes retrieving information associated with at least one satellite vehicle using the identifier wherein the at least one satellite vehicle belongs to a regional satellite system. The method includes receiving a second signal and processing the second signal to obtain first satellite signal information for the at least one satellite vehicle. The method includes determining a position of the wireless device at least partially based on the first satellite signal information. The method can include determining an orbital type of the at least one satellite vehicle and retrieving a Doppler search range corresponding to a Doppler shift at the first location if the orbital type is determined to be geosynchronous. The Doppler search range limits a search for the first satellite signal. In some embodiments, the method includes processing the second signal to obtain second satellite signal information from at least one satellite vehicle that is part of a global navigation satellite system (GNSS) while obtaining the first satellite signal information.

In one embodiment, a wireless device is disclosed. The wireless device includes a first receiver configured to receive an information bearing signal having a first identifier indicative of a first location. The wireless device also includes a second receiver configured to receive a plurality of satellite signals and to determine a position of the wireless device using information from the plurality of satellite signals, wherein the second receiver receives at least one of the plurality of satellite signals using second identifiers for satellite vehicles that are part of a regional satellite system. The wireless device also has a processor configured to obtain the first identifier from the information bearing signal and to retrieve the second identifiers from a memory of the wireless device based on the first identifier. The processor can also be configured to determine an orbital type of the satellite vehicles that are part of the regional satellite system and to retrieve a Doppler search range from the memory if the orbital type is geosynchronous but not necessarily geostationary. The second receiver limits a search for a carrier frequency of the at least one of the plurality of satellite signals based on the Doppler search range. In some embodiments, the second receiver receives signals from a global navigation satellite system using third identifiers and concurrently receives the at least one of the plurality of satellite signals using the second identifiers.

In one embodiment, a position location method for a mobile device is disclosed. The method includes maintaining information associated with satellite vehicles of regional satellite systems in a memory of the mobile device and receiving a terrestrial signal from a cellular base station. The terrestrial signal contains an identifier indicative of a first location. The method also includes determining the availability of a first regional satellite system at the first location based on the identifier and retrieving from the memory a pseudo-random number code corresponding to a first satellite vehicle of the first regional satellite system if the first regional satellite system is available at the first location. The method includes receiving a second signal and processing the second signal using the pseudo-random number code to obtain first satellite signal information. The method also includes determining a position of the mobile device at least partially based on the first satellite signal information.

In one embodiment, a computer-readable medium encoded with one or more instructions for locating the position of wireless devices is disclosed. The one or more instructions include instructions which, when executed by one or more processors, cause the one or more processors to perform steps of receiving a first signal, obtaining an identifier from the first signal indicative of a first location, and retrieving information about at least one satellite vehicle using the identifier. The at least one satellite vehicle is part of a regional satellite system. The steps performed by the one or more processors also include receiving a second signal, processing the second signal to obtain first satellite signal information for the at least one satellite vehicle, and determining a position of the wireless device at least partially based on the first satellite signal information.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS

Figure 1A:
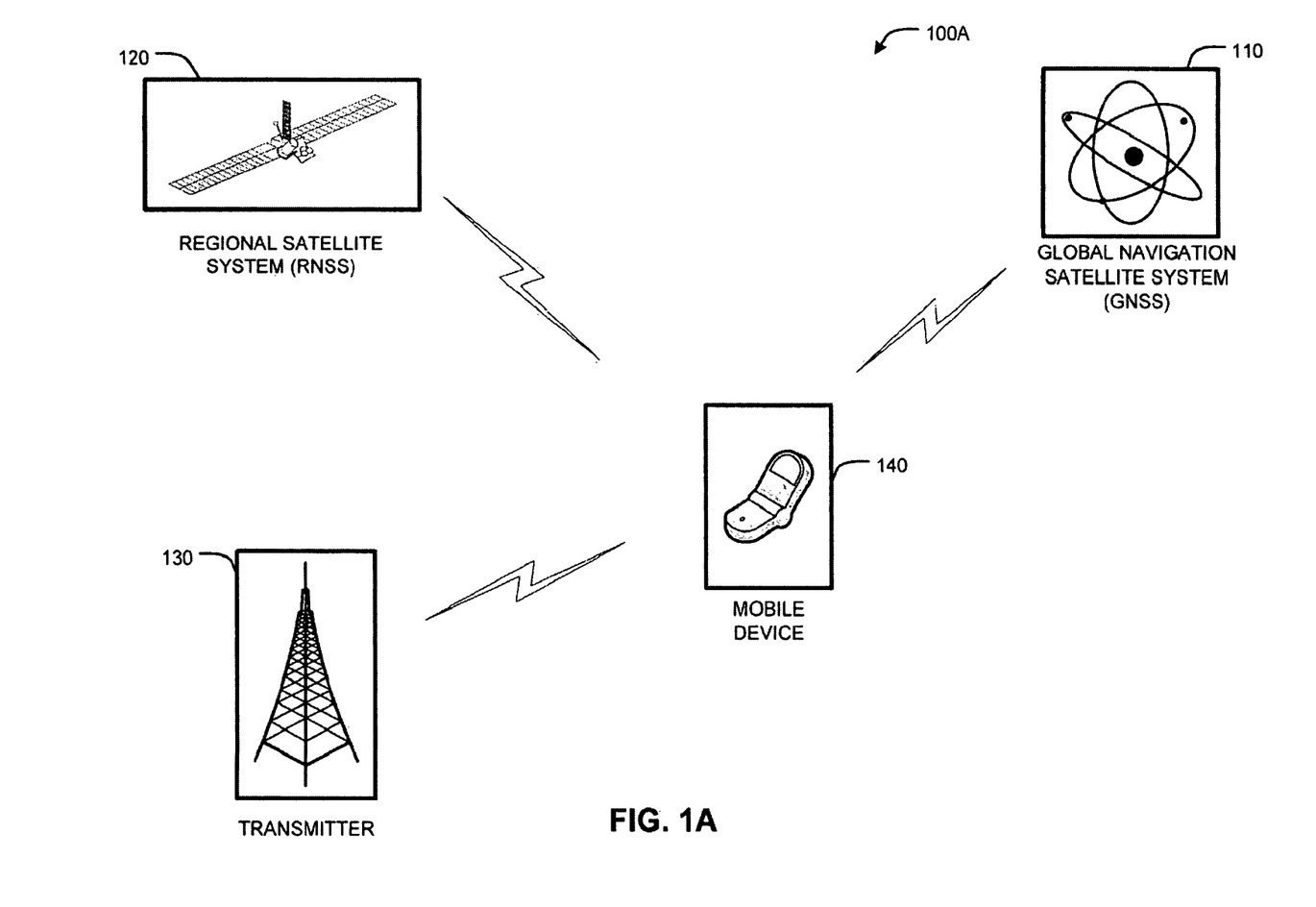
FIG. 1A is a high-level block diagram of an embodiment of a communication system including a global satellite navigation system and a regional satellite system.

FIG. 1A is a high-level block diagram of a communication system 100A in accordance with one embodiment of the present invention. As shown, mobile device 140 can receive signals from global navigation satellite system (GNSS) 110, regional satellite system (RNSS) 120, and transmitter 130. Mobile device 140 uses information obtained from transmitter 130 to determine the availability of satellite signals from particular RNSS satellite vehicles (hereinafter also "SVs" and "satellites") and to limit a Doppler search for such satellite signals. Advantageously, by using information from transmitter 130, mobile device 140 searches for specific regional SVs from which signals are most likely available at its current location before it has acquired a position fix. Additionally, mobile device 140 can limit the search for signals from the regional SVs to a location-specific Doppler search range.

Global navigation satellite system 110 includes one or more satellite navigation systems which provide positioning data to users throughout the world. For example, GNSS 110 can include the Navigation Signal Timing and Ranging Global Positioning System (GPS) operated by the United States. In general, each GPS satellite vehicle modulates a carrier such as the L1 frequency (1575.42 MHz) with a pseudo-random number code (PRN) and a navigation message. The PRN identifies the particular SV which transmitted the signal, and is used by a receiver to determine the time between transmission of the signal at the satellite vehicle and the time of reception at the receiver, from which the distance between the satellite and the receiver can be determined and used for position determination. The navigation message contains orbit information (ephemeris data relating to the transmitting SV's orbit as well as almanac information with approximate positions for other SVs in the GPS satellite constellation), along with other information such as the time information (e.g. time of week or TOW). Although the GPS system is used here for purposes of discussion, it will be recognized that GNSS 110 can include other global satellite navigation systems such as the GLONASS system operated by Russia, the Galileo system under development by the European Union, and global satellite navigation projects such as the COMPASS system scheduled for future deployment by China. The different satellite systems may use different schemes for transmitting information to be used for position determination. For example, satellites of the GLONASS system each use the same PRN code, transmitted on different frequency channels. However, the techniques described herein are not limited to particular message types or transmission schemes.

Regional satellite system 120 includes satellite vehicles which augment the capability of GNSS 110. RNSS satellite vehicles typically have either geostationary or geosynchronous orbits and, as a result, they are visible only in certain parts of the world. In other words, RNSS 120 serves a particular geographic region ("coverage area") defined by the orbits of its particular satellites. For example, RNSS 120 can include the Wide Area Augmentation System (WAAS) covering the United States, the Euro Geostationary Navigation Overlay Service (EGNOS) covering Europe and surrounding areas, the MTSAT Satellite-based Augmentation System (MSAS) serving Japan, and the Quasi-Zenith Satellite System (QZSS). It will be understood that RNSS 120 can also include other regional satellite systems such as the GPS Aided Geo Augmented Navigation (GAGAN) and Indian Regional Navigation Satellite System (IRNSS) systems under development by India and other like systems.

Satellite vehicles in RNSS 120 transmit messages with positioning data. Typically, the RNSS messages are transmitted on the same carrier frequency as SVs in GNSS 110 but are coded to identify a particular RNSS satellite and use a different message format. Regional satellite systems like WAAS and EGNOS use ground stations to monitor the GNSS satellite vehicles in their respective service areas. The ground stations upload correction data to regional SVs which then transmit the correction data in coded satellite messages. One aspect of RNSS 120 is to improve the accuracy, integrity, and reliability of global navigation systems such as GPS and GLONASS.

Mobile device 140 is a wireless device that can receive satellite positioning and other communication signals. For example, mobile device 140 can be a cellular telephone with a position location capability. As shown, mobile device 140 receives voice and data signals from a transmitter 130 such as a cellular base station. However, mobile device 140 is not limited to a cellular telephone, and can also include a personal digital assistant, notebook computer, smartphone, and like communication devices. In some embodiments, mobile device 140 receives FM radio signals, digital television signals, and wired/wireless network communications such as Ethernet, Wi-Fi, WiMAX (Worldwide Interoperability for Microwave Access), and the like.

Transmitter 130 provides a signal with information indicative of its general location or service area. In an exemplary embodiment, transmitter 130 is a cellular base station and its service area is identified by a country code or similar datum. However, transmitter 130 can include other terrestrial and/or satellite sources such as FM radio stations, digital television broadcasts, and wireless or wired data networks. In one embodiment, transmitter 130 is a wireless access point which provides NITZ (Network Identity and Time Zone) information to its clients. World (absolute) time zones, for example, correspond to distinct geographic regions and can therefore serve as location identifiers. In another embodiment, transmitter 130 is a server which can provide mobile device 140 with a network address or similar identifier. For example, an Internet service provider can assign a client computer an IP (Internet Protocol) which corresponds roughly to a geographic location.

Mobile device 140 uses the location information from transmitter 130 to determine the availability of RNSS 120 satellite vehicles. If the location information indicates a country in Europe, for example, then mobile device 140 can determine that it is likely within the EGNOS coverage area and can search for EGNOS satellite vehicles. Similarly, if the location information indicates the United States, then mobile station 140 can determine that it is likely within the WAAS coverage area and can limit its search accordingly. Since RNSS 120 satellite vehicles maintain geostationary or geosynchronous orbits and provide correction data for use within their specific coverage areas, mobile device 140 avoids searching for SVs that are not visible and/or do not have data which can be used to determine its position.

By way of illustration, assume that mobile device 140 is located somewhere in Europe and that it does not have a position fix. Also assume that mobile device 140 lacks data which may have been acquired from a previous position fix, or that prior positioning data has become stale. In this cold-start condition, mobile device 140 lacks information about the availability of RNSS 120 satellite vehicles. However, if mobile device 140 has received signals from a base station (even prior to the current power-on condition), it may have obtained a mobile country code (MCC) or similar geographic identifier. For example, when activated, mobile device 140 may have automatically acquired signals from a serving base station indicating that it is somewhere in Germany. Using this information, mobile device 140 determines that it is within the EGNOS coverage area and identifies specific EGNOS (regional) satellite vehicles from which it can receive positioning data. This can be done in parallel with a search for global satellite vehicles in GNSS 110 thereby accelerating the process of obtaining an accurate position fix. Alternatively, mobile device can use health information obtained from the SVs of RNSS 120 to further refine its search for GNSS satellites.

Figure 1B:
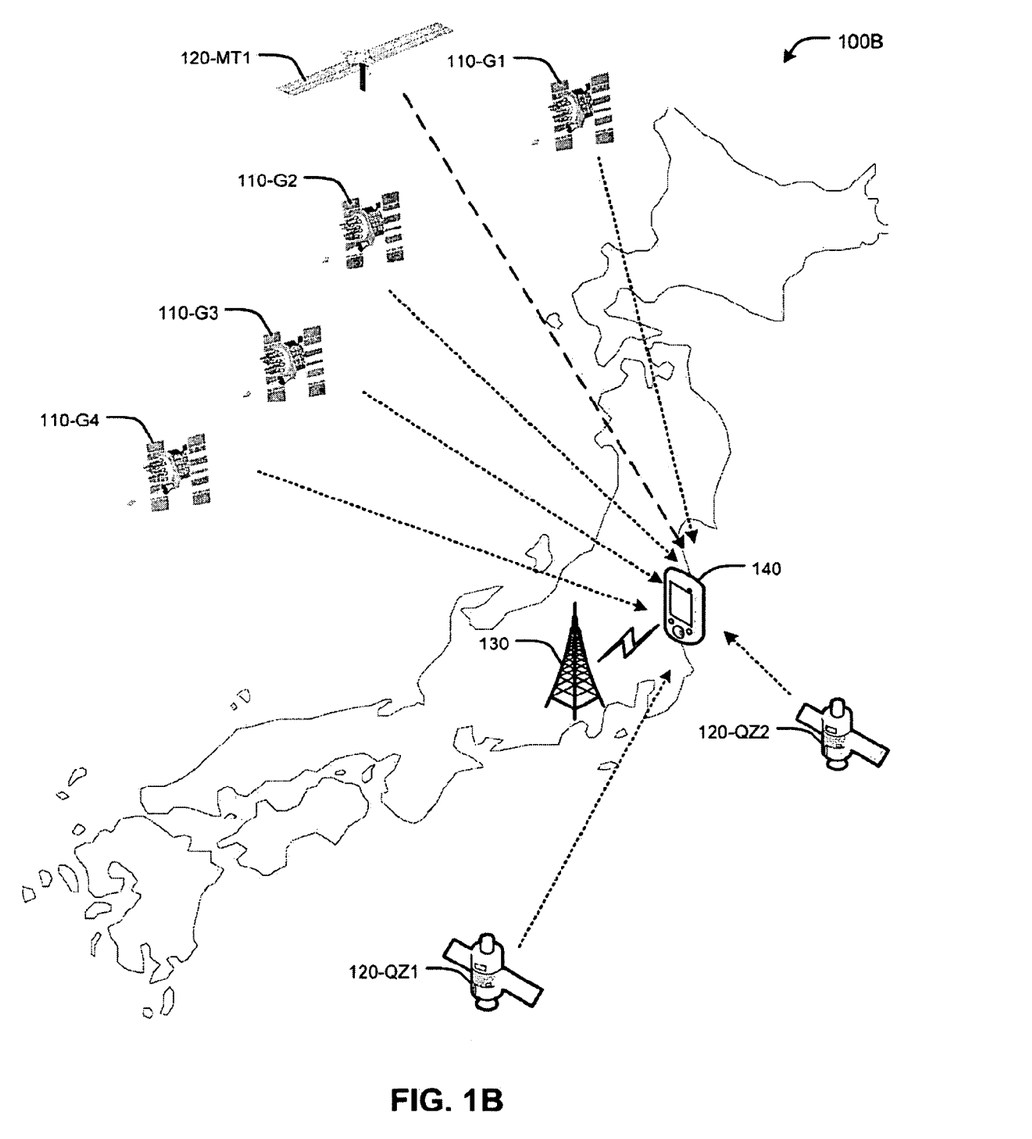
FIG. 1B shows a further embodiment of a communication system including a global navigation satellite system and two regional satellite systems in relation to a particular geographic area.

FIG. 1B is a diagram illustrating aspects of a communication system 100B in a specific geographic area. As shown, satellite vehicles of GNSS 110 and RNSS 120 have a coverage area which includes Japan. Mobile device 140 is a personal digital assistant (PDA) which receives signals from transmitter 130 as well as from global navigation satellites 110-G and regional satellites 120-MT, 120-QZ.

In the presently described embodiment, RNSS 120 includes two regional systems. The first regional system is the MTSAT Satellite-based Augmentation System (MSAS) represented by satellite vehicle 120-MT. MSAS satellite 120-MT maintains a geostationary orbit above Japan and provides augmentation data as previously discussed. Satellite vehicles 120-QZ1, 120-QZ2 are part of the Quasi-Zenith Satellite System (QZSS). QZSS satellites 120-QZ maintain a geosynchronous orbit having a coverage area (ground track) extending roughly from Japan to Australia. The orbit of QZSS satellite vehicles 120-QZ is known and thus their elevation and Doppler characteristics can be determined on a country-by-country basis throughout the coverage area.

Mobile device 140 receives an identifier from transmitter 130 indicative of a geographic area. As previously noted, different identifiers may be used and may have varying degrees of precision. A world time-zone identifier, for example, may indicate only that the location (Japan) is within a particular 15-degree longitudinal slice of the earth. On the other hand, a country code or similar identifier may indicate that the location is Japan or possibly one of the Japanese islands.

Using the identifier, mobile device 140 retrieves information about the availability of RNSS 120 satellite vehicles. In the case of Japan, mobile device 140 determines that both MSAS and QZSS satellite vehicles are available in addition to the GNSS 110 global navigation satellites. Similarly, mobile device 140 can eliminate SVs in the WAAS and EGNOS systems as possible search candidates.

After determining the availability of one or more regional satellite systems, mobile device 140 prioritizes a search for SVs. For example, QZSS satellites 120-QZ are expected to transmit GPS-interoperable signals for position location as well as correction data for GNSS satellites 110-G within the QZSS coverage area. Similarly, the orbits of the QZSS satellite vehicles will be such that at least one is at a high degree of inclination above Tokyo nearly all of the time. Mobile device 140 can store this and other information about RNSS 120 and its particular SVs and can use it to prioritize the search for positioning signals.

Beyond the availability of regional satellite systems, mobile device 140 can access information with which to limit the search for signals from a particular regional satellite vehicle. This can include limiting a Doppler search for QZSS satellite vehicles based upon the location identifier received from transmitter 130. For example, the Doppler shift of signals from QZSS satellite vehicles 120-QZ is location dependent. It is generally about ±250 m/s in Japan, but can reach ±500 m/s in Australia. In the worst-case scenario, the QZSS Doppler shift is around ±650 m/s. Thus, if the identifier indicates Japan as being the rough location, the search range for the QZSS satellite vehicles 120-QZ can be restricted to frequencies corresponding to Doppler shifts of about ±250 m/s to significantly improve search times.

It will be recognized that the present invention is not limited to a particular geographic region or to a particular regional satellite system. Instead, embodiments of the present invention broadly encompass determining the availability of RNSS systems based upon a location identifier and identifying satellite vehicles within the available RNSS systems. Also, it will be understood that satellite identifiers such as pseudo random number (PRN) codes and frequency channel numbers can be used to identify specific SVs within a regional satellite system. Frequency channel numbers, for example, can be used with satellite systems like Glonass which transmit signals using frequency division multiple access (FDMA) or like techniques. Information about available RNSS systems and their satellites is accessed to improve search performance and enhance position location determination. Accordingly, it is specifically contemplated that embodiments of the present invention can be used with existing and future regional satellite systems without limitation.

Figure 2:
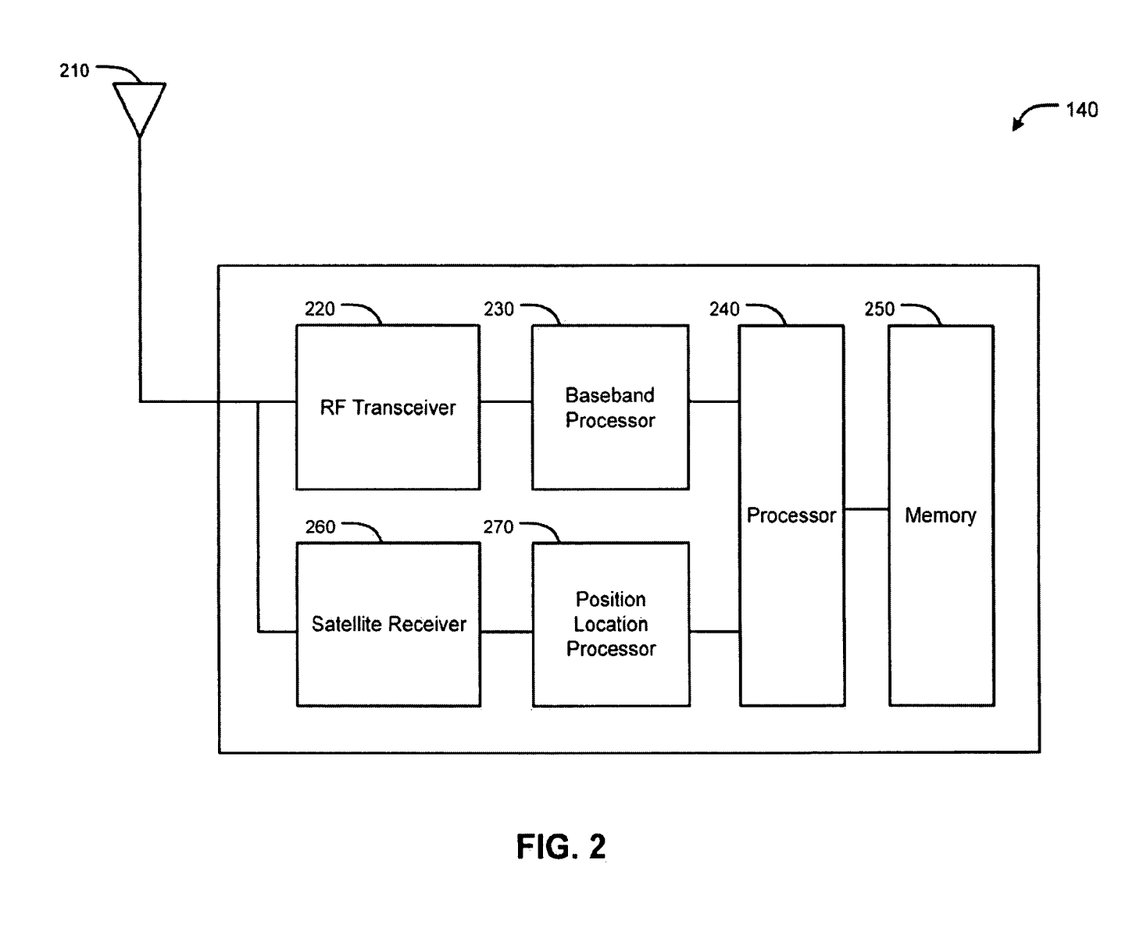
FIG. 2 is a functional block diagram of a mobile device such as can be used with the communication systems of FIGS. 1A-1B.

FIG. 2 is a functional block diagram of an embodiment of mobile device 140. As shown, mobile device 140 includes an RF transceiver 220 and a satellite receiver 260 both of which are coupled to antenna 210. RF transceiver 220 is also coupled to baseband processor 230. On the receive path, RF transceiver 220 receives an incoming RF signal and delivers it to baseband processor 230. Baseband processor 230 recovers information from the RF signal. For example, baseband processor 230 can demodulate and decode the received signal in addition to performing other signal processing functions. On the transmit path, baseband processor 230 performs coding and modulation of data received from processor 240 and delivers the outgoing RF signal to RF transceiver 220.

In various embodiments, processor 240 obtains a location identifier from the data recovered by baseband processor 230. As previously discussed, the location identifier can be a country code transmitted by a cellular base station, world time zone information, network address, or like data indicative of a particular geographic area. Memory 250 stores information for determining the availability of one or more regional satellite systems as well as identifiers for the particular regional satellite vehicles. Additionally, memory 250 may store Doppler search ranges for the regional satellite vehicles at particular locations. In some embodiments, memory 250 includes a non-volatile storage element such as a flash memory or battery-powered static random access memory (SRAM) device.

Figure 3A:
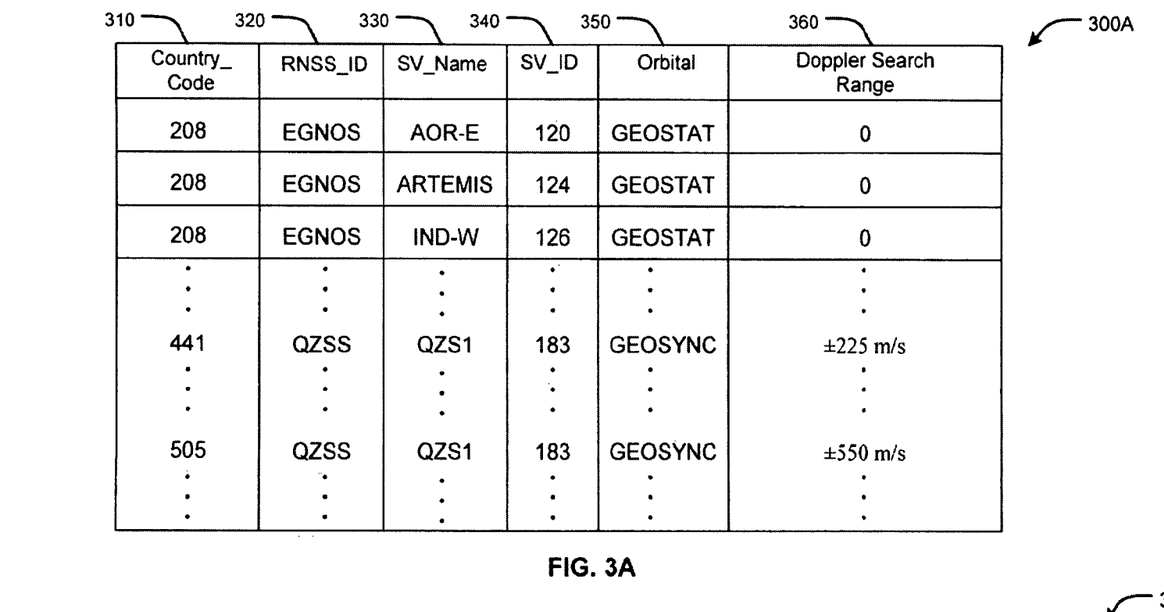
FIGS. 3A-3B show exemplary data structures for storing information about regional satellite systems.
Figure 3B:
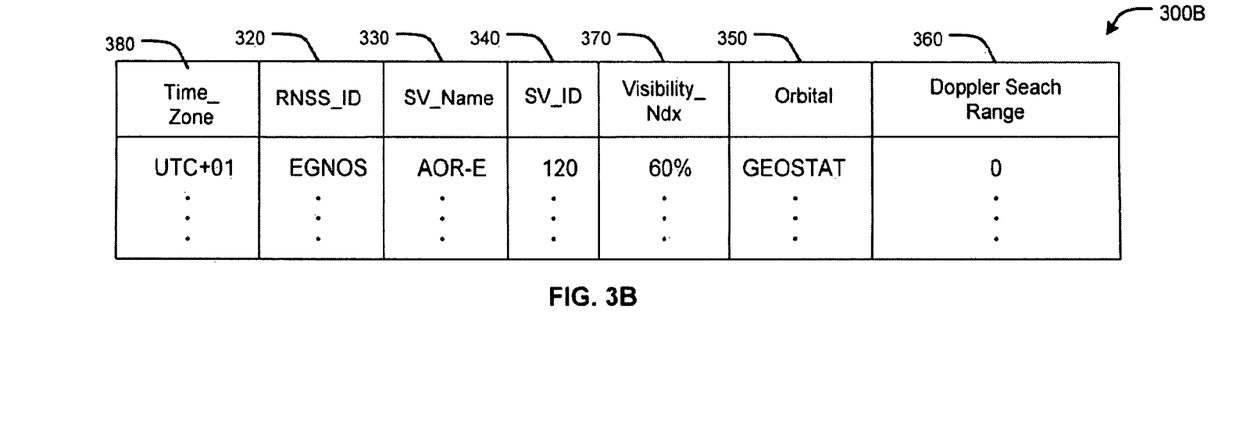

FIGS. 3A-3B show exemplary data structures 300 such as can be used to supply information about a satellite in a regional satellite system. Each data structure may include an array of individual data elements and may be stored in memory 250 for access by processor 240. For example, data structures 300 may include data elements for each satellite in each regional satellite system. In some embodiments, memory 250 stores several different data structures 300 each of which can be indexed according to one or more location identifiers and which can be updated by processor 240.

Data structure 300A includes exemplary information relating to satellite vehicles in a regional satellite system organized by Country_Code 310. As shown, RNSS_ID 320, SV_Name 330, and SV_ID 340 values are provided for regional satellites by country code 310. In one embodiment, country code 310 corresponds to a list of mobile country codes (MCC) such as that promulgated in ITU E.212 (Recommendation 212 from the International Telecommunication Union). RNSS_ID 320 corresponds to a particular regional satellite system such as WAAS, EGNOS, MSAS, QZSS etc. SV_Name 330 is the name of a particular satellite vehicle within the RNSS indicated by RNSS_ID. SV_ID 340 is an identifier such as a pseudo-random number (PRN) code corresponding to a PRN used by the regional satellite vehicle to code its transmissions. Orbital 350 indicates whether the satellite vehicle (SV_Name) is in geosynchronous, geostationary, or other earth orbit. For satellite vehicles in geostationary orbits, Doppler search range 360 may be zero or omitted. Otherwise, Doppler search range 360 can specify a value for use in limiting a search for the carrier signal of SV_Name 330 at the location indicated by country code 310.

For illustrative purposes, data structure 300A is shown with exemplary data elements for country code 208 (France), 441 (Japan), and 505 (Australia). France is within Europe and thus the RNSS_ID corresponding to country code 208 is EGNOS. Within the EGNOS regional satellite system, satellite vehicles AOR-E, ARTEMIS, and IND-W are identified as being potential search candidates for locations in France. The pseudo-random number codes of the EGNOS satellite vehicles are 120, 124, and 126 respectively. As indicated, these satellite vehicles maintain geostationary orbits (GEOSTAT) and hence their Doppler shifts are typically very small. For example, the Doppler shift associated with WAAS satellite vehicles in the United States may be on the order of about ±40 m/s (that is, a frequency shift corresponding to a relative velocity of the satellite toward/away from the receiver of about ±40 m/s). Thus, in some embodiments, a Doppler search value of zero may be used for geostationary regional satellite vehicles. In other embodiments, data structures 300 may store more precise measured values of Doppler shift and/or Doppler search ranges for each regional satellite vehicle at each geographic location.

As previously discussed, Japan is within the coverage area of both the MSAS and QZSS regional satellite systems. Thus, country code 441 includes information about satellite vehicles in both regional satellite systems. The exemplary data element for Japan indicates the availability of satellite vehicle QZS1 in the QZSS system. The exemplary data element also indicates that data transmitted by QZS1 is coded with pseudo-random number code 183, that QZS1 is in geosynchronous (GEOSYNC) orbit, and that the Doppler search range for locations within Japan is around ±225 m/s.

Lastly, an exemplary data element for country code 501 (Australia) is included for comparison. As indicated, country code 505 is also within the QZSS coverage area and may be able to receive satellite signals from QZS1 using pseudo-random number code 183. However, in Australia, a wider range of frequencies may need to be searched in order to locate the QZS1 signal. Thus, the exemplary data element indicates that satellite QZS1 is potentially available for country code 505 and that an appropriate value of the Doppler search range is around ±550 m/s for that location.

FIG. 3B shows an alterative data structure 300B such as can be used to store information about the availability and identity of regional satellite vehicles. Data structure 300B can be stored in memory 250 and, in some embodiments, may supplement or replace data structure 300A. Each data element includes a Time_Zone 380 field indicative of a corresponding geographic region. For each time zone, a regional satellite system (RNSS_ID), satellite vehicle (SV_Name), and pseudo-random number are identified as previously discussed. A visibility index (Visibility_Ndx 390) is also provided. Since world time zones represent longitudinal slices of the Earth, satellite visibility may vary within a particular time zone.

To illustrate this point, an exemplary data element for time zone UTC+01 is shown. UTC+01 includes both Italy and Namibia. While EGNOS satellites are visible from Europe (and parts of North Africa), they may not be visible elsewhere on the African continent. Thus, Visibility_Ndx 390 provides an indication of the likelihood that a particular regional satellite is visible from locations within a particular time zone. Here, Visibility_Ndx 390 indicates a 60% likelihood of receiving positioning data from satellite AOR-E at locations within the UTC+01 time zone. The visibility index may be determined according to population, area, and other criteria relevant to the availability of coverage within a particular time zone.

Although discussed separately, it will be recognized that data structures 300A, 300B may be combined in a single data structure and that embodiments of the present invention may include additional data structures with location-specific information about regional satellite systems. For example, exemplary data structures may include multiple search-keys based upon country code, time zone, network address, and like identifiers. Also, for purposes of discussion, only a portion of each data structure is depicted. In some embodiments, data structures 300 store information about each RNSS system and its satellites in connection with each unique value of relevant location-based identifiers.

Referring again to FIG. 2, processor 240 uses the location identifier to access a data structure (e.g., 300A, 300B) in memory 250. If it is determined that one or more regional satellite systems is available, processor 240 provides information about its SVs to position location processor 270. Among other information, processor 240 can provide pseudo-random number codes (or other satellite identifiers) and Doppler search values for each regional SV to position location processor 270 to aid in a search for coded satellite signals. Processor 240 may also cause information about the RNSS and its SVs to be shown on a display screen of mobile device 140. In various embodiments, processor 240 displays a map corresponding to the location identifier superimposed with the relative position of geostationary SVs and/or a representation of the ground track of geosynchronous SVs.

In some embodiments, processor 240 is configured to update data structures 300 in response to changes in the regional satellite systems. For example, as regional satellite vehicles are added or removed from a particular RNSS, processor 240 can add or remove data elements corresponding to these regional SVs. Also, if the coverage area of a regional satellite system changes or if a new regional satellite system becomes available in a particular location, processor 240 can update data elements within data structures 300 accordingly. Updates to data structures 300 can be made periodically or on an as-needed basis allowing mobile device 140 to maintain current information.

Position location processor 270 controls the operation of satellite receiver 260 and determines the position of mobile device 140. Position location processor 270 receives parameters such as PRN codes and Doppler search values from processor 240 and searches for corresponding signals received at satellite receiver 260. In some embodiments, position location processor 270 cross-correlates satellite signals with a signal generated locally using the PRN of a particular SV. Because the PRN values correspond to regional SVs which serve the geographic location, the probability of finding the signals is increased and mobile device 140 thus avoids searching for regional SVs which do not provide positioning data for its present location.

In addition, position location processor 270 minimizes the range of Dopplers that may need to be searched in order to locate the desired satellite signal using the Doppler search data. For example, with GPS satellites, position location processor 270 may need to search carrier frequencies that correspond to Doppler shifts of up to ±900 m/s. That is, position location processor 270 may need to correlate the received satellite signal with internally generated versions of the PRN code at different code offsets and with different Doppler shift values spanning the range of possible Doppler shifts (a two-dimensional search). A maximum in the correlation result corresponds to a particular code phase of the received satellite signal, which can then be used to determine the position of the receiver. The initial search ("acquisition") can be quite time-consuming, depending on the amount of information available to the position location processor 270. However, if it is known that a particular SV is in geostationary orbit, this additional frequency search can be reduced or eliminated (since the relative velocity of the satellite toward or away from the receiver is small). Similarly, with geosynchronous SVs, position location processor 270 can limit its search to a location-specific Doppler range determined based on Doppler search range 360, which may be substantially smaller than the search range for global satellite systems. In this way, position location processor 270 can search for regional SVs using location-appropriate PRN codes and/or other satellite identifiers and optimal Doppler search parameters.

It will be understood that embodiments of the present invention can perform a location-specific search for satellite vehicles based upon an approximate geographic location such as may be obtained from a terrestrial source. No additional information is required to perform the search. In particular, it is not necessary to have first acquired ephemeris, almanac, or satellite time information. Efficiency is improved by searching for signals from regional satellite vehicles for which there is a high probability of detection and avoiding a search for regional satellites known to be unavailable. Also, the time to acquire the satellite signals can be reduced by use of a location-dependent Doppler search range. In particular, since the disclosed technique reduces (or eliminates) the Doppler shift search space without the need for current almanac, ephemeris, or other time-dependent satellite orbital information, it can provide a substantial benefit in terms of acquisition time in a cold start condition. For example, in a particular embodiment, a satellite receiver may use a limited Doppler search range (that is, less than the minimum Doppler search range for GNSS satellites) to obtain position information associated with a regional satellite vehicle prior to accessing current satellite orbital information (e.g., current ephemeris, almanac, and/or other orbital information such as longer term orbital information).

Figure 4:
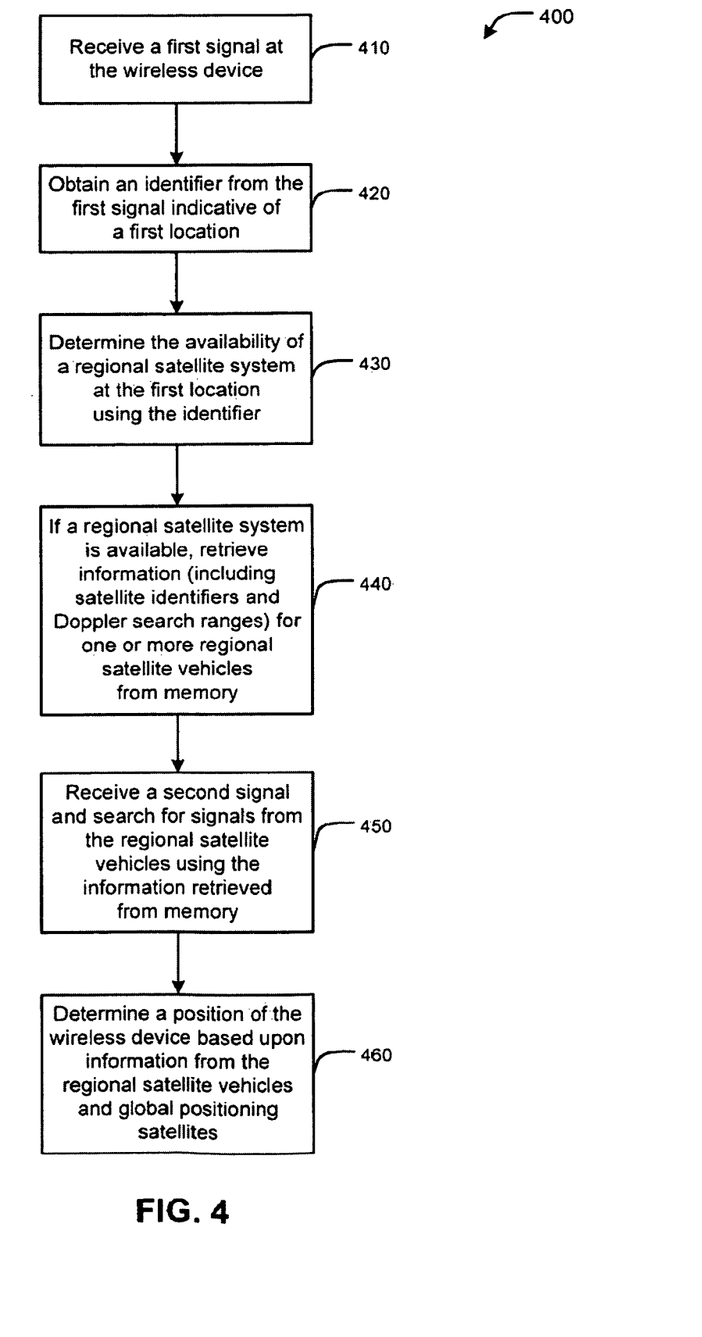
FIG. 4 is a flowchart illustrating one embodiment of a position location method for use with a wireless device.

FIG. 4 is a flowchart showing an exemplary position location method 400 for a wireless device. Position location method 400 can be performed by a processor such as processor 240 and/or position location processor 270. At block 410, a first signal is received at the wireless device. In some embodiments, the first signal is a terrestrial signal having an identifier indicative of a geographic location. The identifier can serve, for example, as a rough indicator of the area in which the wireless device is located.

At block 420, the identifier is obtained from the first signal. Thereafter, at block 430, the identifier is used to determine the availability of a regional satellite system at the first location. This may involve, for example, determining whether the first location is within the coverage area of one or more regional satellite systems such as WAAS, EGNOS, MSAS, and QZSS. If the first location is within the coverage area of one or more regional satellite systems, information about the specific satellite vehicles is retrieved. At block 440, a satellite identifier and Doppler search range for regional satellite vehicles determined to be available at the first location are retrieved from a memory or other storage accessible to the wireless device. In some embodiments, information about the regional satellites is maintained in a non-volatile memory of the wireless device.

At block 450, a second signal including signals from one or more satellite vehicles is received at a satellite receiver, and a search is performed for regional satellite vehicles using the information retrieved from the memory. The search can include generating reference signals at the wireless device using PRN codes for the particular regional satellite vehicles and cross-correlating the reference signals with signals obtained from a satellite receiver to obtain position information. The Doppler search range can limit the frequencies that are searched with the reference signals. In this way, a targeted search for those regional satellite vehicles serving the first location is performed and the search space is determined according to the first location. In addition, the location-based search for regional satellites can be performed in parallel with a search for global positioning satellites to further improve search performance.

At block 460, a position of the wireless device is determined using information obtained from the satellite signals. For example, the position may be determined according to well known techniques in which correlation is used to determine code phases of the received signals for a plurality of satellite vehicles, and the code phases are used to determine distances between the satellites and the receiver, which in turn can be used to determine position. In some instances, such as with the QZSS system, regional satellite vehicles alone may provide sufficient positioning data to get a position fix for the wireless device. In other cases, regional satellite vehicles may supply only correction data with which to supplement positioning information obtained from global satellite vehicles. In some embodiments, one or more satellite signals may be used in conjunction with additional information to obtain the position of the wireless device; for example, time of flight or round trip delay information for terrestrial sources may be used with satellite signals for position determination.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASICS), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A position location method for a wireless device comprising:
   receiving a first signal;
   obtaining an identifier indicative of a first location from the first signal;
   identifying a regional satellite system servicing a particular geographic region comprising the first location based at least in part on the identifier, wherein the regional satellite system comprises at least one satellite vehicle comprising a geostationary or geosynchronous orbit;
   retrieving information associated with the at least one satellite vehicle;
   receiving a second signal;
   processing the second signal to obtain first satellite signal information for the at least one satellite vehicle; and
   determining a position of the wireless device at least partially based on the first satellite signal information.

2. The method of claim 1 wherein the identifier comprises a country code corresponding to the first location.

3. The method of claim 1 wherein receiving the first signal further comprises receiving a signal from a cellular base station.

4. The method of claim 1, wherein processing the second signal to obtain the first satellite signal information comprises processing the second signal using a limited Doppler search range prior to accessing current satellite orbital information.

5. The method of claim 1 wherein the identifier comprises a world time zone of the first location.

6. The method of claim 1 wherein the first identifier comprises at least a portion of a network address of the wireless device.

7. The method of claim 1 further comprising updating the information associated with the at least one satellite vehicle.

8. The method of claim 1 wherein retrieving the information associated with the at least one satellite vehicle further comprises accessing data in a non-volatile storage of the wireless device.

9. The method of claim 1 wherein the information associated with the at least one satellite vehicle comprises a pseudo-random number code (PRN) used for coding the first satellite signal.

10. The method of claim 9 wherein processing the second signal comprises:
    generating a reference signal using the pseudo-random number code; and
    cross-correlating the second signal and the reference signal.

11. The method of claim 1 wherein the information associated with the at least one satellite vehicle comprises a Doppler search range corresponding to the first location, and wherein processing the second signal comprises searching for a carrier of the at least one satellite vehicle based on the Doppler search range.

12. The method of claim 1 wherein the regional satellite system is selected from the group consisting of the Wide Area Augmentation System (WAAS), European Geostationary Overlay Service (EGNOS), MTSAT Satellite-based Augmentation System (MSAS), Quasi-Zenith Satellite System (QZSS), GPS Aided Geo Augmented Navigation (GAGAN), and Indian Regional Navigation Satellite System (IRNSS) systems.

13. The method of claim 1 further comprising:
    while obtaining the first satellite signal information, processing a third signal to obtain second satellite signal information for a second satellite vehicle, wherein the second satellite vehicle is part of a global navigation satellite system (GNSS).

14. The method of claim 13 wherein the global navigation satellite system is selected from the group consisting of the GPS, GLONASS, GALILEO, and COMPASS systems.

15. The method of claim 1 further comprising:
    determining an orbital type of the at least one satellite vehicle; and retrieving a Doppler search range corresponding to the at least one satellite vehicle if the orbital type is determined to be geosynchronous; and
    wherein processing the second signal comprises limiting a search for the first satellite signal based on the Doppler search range.

16. The method of claim 1 wherein the first location is a country within a coverage area of the Quasi-Zenith Satellite System (QZSS), the method further comprising:
    retrieving a Doppler search range corresponding to the at least one satellite vehicle for the country indicated by the identifier; and
    limiting a search for the first satellite signal based on the Doppler search range.

17. A wireless device comprising:
    a first receiver to receive an information bearing signal having a first identifier indicative of a first location;

a second receiver to receive a plurality of satellite signals from a regional satellite system servicing a particular geographic region comprising the first location; and a processor configured to:
- obtain the first identifier from the information bearing signal and use the first identifier to retrieve second identifiers from a memory of the wireless device;
- identify the regional satellite system based at least in part on the first identifier;
- process at least one of the plurality of satellite signals using second identifiers; and
- determine a position of the wireless device using information from the plurality of satellite signals.

18. The wireless device of claim 17 wherein the second identifiers are associated with satellite vehicles that are part of at least one regional satellite system having the first location within its coverage area.

19. The wireless device of claim 17 wherein the first receiver receives the information bearing signal from a cellular base station.

20. The wireless device of claim 19 wherein the first identifier comprises a country code associated with the cellular base station.

21. The wireless device of claim 17 wherein the first identifier comprises a world time zone of the first location.

22. The wireless device of claim 17 wherein the first identifier comprises a portion of a network address of the wireless device and the processor is configured to retrieve the second identifiers from the memory based upon the portion of the network address.

23. The wireless device of claim 17 wherein the first identifier comprises a country code and the processor is configured to retrieve the second identifiers from the memory based on the country code.

24. The wireless device of claim 17 wherein the memory comprises a non-volatile memory and the second identifiers are stored in the non-volatile memory.

25. The wireless device of claim 17 wherein the processor is configured to update the first and second identifiers in the memory.

26. The wireless device of claim 17 wherein the second identifiers comprise at least one pseudo-random number (PRN) code for the satellite vehicles that are part of the regional satellite system.

27. The wireless device of claim 26 wherein the second receiver is configured to generate a reference signal using one of the at least one pseudo-random numbers and to cross-correlate the at least one of the plurality of satellite signals with the reference signal.

28. The wireless device of claim 17 wherein the processor uses the first identifier to retrieve a Doppler search range corresponding to the first location and the second receiver searches for a carrier of the at least one of the plurality of satellite signals based on the Doppler search range.

29. The wireless device of claim 17 wherein the regional satellite system is selected from the group consisting of the Wide Area Augmentation System (WAAS), European Geostationary Overlay Service (EGNOS), MTSAT Satellite-based Augmentation System (MSAS), Quasi-Zenith Satellite System (QZSS), GPS Aided Geo Augmented Navigation (GAGAN) system, and Indian Regional Navigation Satellite System (IRNSS) systems.

30. The wireless device of claim 17 wherein the second receiver receives signals from a global navigation satellite system (GNSS) using third identifiers and concurrently receives the at least one of the plurality of satellite signals using the second identifiers.

31. The wireless device of claim 30 wherein the global satellite positioning system is selected from the group consisting of the GPS, GLONASS, GALILEO, and the COMPASS systems.

32. The wireless device of claim 17 wherein the processor determines an orbital type of the satellite vehicles that are part of the regional satellite system and retrieves a Doppler search range from the memory if the orbital type is geosynchronous, and wherein the second receiver limits a search for a carrier frequency of the at least one of the plurality of satellite signals based on the Doppler search range.

33. The wireless device of claim 17 wherein the first identifier is indicative of a country and the regional satellite system is the Quasi-Zenith Satellite System (QZSS), the processor being configured to retrieve a Doppler search range corresponding to the QZSS satellite vehicles and to the country indicated by the identifier, and wherein the second receiver limits a search for a carrier frequency of the at least one of the plurality of satellite signals based on the Doppler search range.

34. A position location method for a mobile device comprising:
- maintaining information associated with satellite vehicles of regional satellite systems in a memory of the mobile device, at least one of the satellite vehicles of the regional satellite systems having a geostationary or geosynchronous orbit;
- receiving a terrestrial signal from a cellular base station;
- obtaining an identifier indicative of a first location from the terrestrial signal;
- identifying a first regional satellite system servicing a particular geographic region comprising the first location based at least in part on the identifier;
- determining an availability of the first regional satellite system at the first location using the identifier;
- retrieving from the memory a pseudo-random number code corresponding to a first satellite vehicle of the first regional satellite system if the first regional satellite system is available at the first location;
- receiving a second signal;
- processing the second signal using the pseudo-random number code to obtain first satellite signal information; and
- determining a position of the mobile device at least partially based on the first satellite signal information.

35. The position location method of claim 34, wherein processing the second signal to obtain the first satellite signal information comprises processing the second signal using a limited Doppler search range prior to accessing current satellite orbital information.

36. The position location method of claim 34 further comprising: retrieving from the memory a Doppler search range corresponding to the first satellite vehicle at the first location, and wherein processing the second signal comprises searching for a carrier of the first satellite vehicle based on the Doppler search range.

37. The position location method of claim 34 further comprising: displaying information associated with the first regional satellite system if the first regional satellite system is available at the first location.

38. The position location method of claim 34 further comprising:
- while obtaining the first satellite signal information, processing a third signal to obtain second satellite signal information for a second satellite vehicle, wherein the second satellite vehicle is part of a global navigation satellite system (GNSS).

39. The position location method of claim 34 wherein the first location is within a coverage area of the Quasi-Zenith Satellite System (QZSS) system, the method further comprising: determining a Doppler search range associated with the first satellite vehicle and the first location.

40. A non-transitory computer-readable medium encoded with one or more instructions for locating the position of a wireless device, the one or more instructions including instructions which are executable by one or more processors to:
- obtain an identifier indicative of a first location from a first received signal;
- identify a regional satellite system servicing a particular geographic region comprising the first location based at least in part on the identifier, wherein the regional satellite system comprises at least one satellite vehicle comprising a geostationary or geosynchronous orbit;
- retrieve information associated with the at least one satellite vehicle;
- process a second received signal to obtain first satellite signal information for the at least one satellite vehicle; and
- determine a position of the wireless device at least partially based on the first satellite signal information.

41. A wireless device comprising:
- means for receiving an information bearing signal having a first identifier indicative of a first location;
- means for identifying a regional satellite system servicing a particular geographic region comprising the first location based at least in part on the identifier, wherein the regional satellite system comprises at least one satellite vehicle comprising a geostationary or geosynchronous orbit;
- means for receiving a plurality of satellite signals and determining a position of the wireless device using information from the satellite signals, wherein at least one of the plurality of satellite signals is received using second identifiers for satellite vehicles that are part of the regional satellite system; and
- means for obtaining the first identifier from the information bearing signal and using the first identifier to retrieve the second identifiers from a storage means of the wireless device.

* * * * *